United States Patent
Mula et al.

(10) Patent No.: US 10,298,500 B2
(45) Date of Patent: *May 21, 2019

(54) USING CONSISTENT HASHING FOR ECMP ROUTING

(71) Applicant: MELLANOX TECHNOLOGIES TLV LTD., Raanana (IL)

(72) Inventors: Liron Mula, Ramat Gan (IL); Gil Levy, Hod Hasharon (IL); Aviv Kfir, Nili (IL)

(73) Assignee: MELLANOX TECHNOLOGIES TLV LTD., Ra'anana (IL)

( * ) Notice: Subject to any disclaimer, the term of this patent is extended or adjusted under 35 U.S.C. 154(b) by 0 days.

This patent is subject to a terminal disclaimer.

(21) Appl. No.: 15/810,065

(22) Filed: Nov. 12, 2017

(65) Prior Publication Data

US 2019/0044863 A1 Feb. 7, 2019

Related U.S. Application Data

(63) Continuation of application No. 15/670,055, filed on Aug. 7, 2017, now Pat. No. 9,853,900.

(51) Int. Cl.
| | | |
|---|---|---|
| *H04L 12/28* | (2006.01) | |
| *H04L 12/803* | (2013.01) | |
| *H04L 12/743* | (2013.01) | |
| *H04L 12/24* | (2006.01) | |
| *H04L 12/709* | (2013.01) | |
| *H04L 12/707* | (2013.01) | |

(52) U.S. Cl.
CPC ........ *H04L 47/125* (2013.01); *H04L 41/0893* (2013.01); *H04L 45/24* (2013.01); *H04L 45/245* (2013.01); *H04L 45/7453* (2013.01)

(58) Field of Classification Search
CPC ... H04L 47/125; H04L 45/24; H04L 45/7453; H04L 41/0893; H04L 45/245
See application file for complete search history.

(56) References Cited

U.S. PATENT DOCUMENTS

| | | | |
|---|---|---|---|
| 7,190,696 B1 * | 3/2007 | Manur | H04L 45/00 370/392 |
| 9,019,962 B1 | 4/2015 | Ghosh | |
| 10,116,567 B1 | 10/2018 | Singh et al. | |
| 2008/0181103 A1 * | 7/2008 | Davies | H04L 47/10 370/230 |
| 2012/0163389 A1 * | 6/2012 | Zhang | H04L 45/24 370/400 |
| 2013/0039169 A1 * | 2/2013 | Schlansker | H04L 45/48 370/225 |
| 2013/0201989 A1 * | 8/2013 | Hu | H04L 45/24 370/392 |

(Continued)

OTHER PUBLICATIONS

U.S. Appl. No. 15/713,776 office action dated Jan. 11, 2019.

*Primary Examiner* — Clemence S Han
(74) *Attorney, Agent, or Firm* — Kligler & Associates

(57) ABSTRACT

ECMP routing is carried out in fabric of network entities by representing valid destinations and invalid destinations in a group of the entities by a member vector. The order of the elements in the member vector is permuted. A portion of the elements in the permuted vector is pseudo-randomly masked. A flow of packets is transmitted to the first valid destination in the masked member vector.

18 Claims, 11 Drawing Sheets

(56) References Cited

U.S. PATENT DOCUMENTS

| | | | |
|---|---|---|---|
| 2013/0279503 A1* | 10/2013 | Chiabaut | H04L 45/44 |
| | | | 370/389 |
| 2013/0308444 A1* | 11/2013 | Sem-Jacobsen | H04L 47/125 |
| | | | 370/230 |
| 2015/0163146 A1* | 6/2015 | Zhang | H04L 47/125 |
| | | | 370/238 |
| 2015/0281082 A1* | 10/2015 | Rajahalme | H04L 45/7453 |
| | | | 370/392 |
| 2015/0372916 A1* | 12/2015 | Haramaty | H04L 45/24 |
| | | | 370/392 |
| 2016/0134535 A1* | 5/2016 | Callon | H04L 45/48 |
| | | | 370/390 |
| 2017/0048144 A1* | 2/2017 | Liu | H04L 47/122 |

* cited by examiner

USING CONSISTENT HASHING FOR ECMP ROUTING

CROSS-REFERENCE TO RELATED APPLICATIONS

This Application is a continuation of U.S. application Ser. No. 15/670,055, filed 7 Aug. 2017, which is herein incorporated by reference.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

This invention relates to transmission of digital information. More particularly, this invention relates to hashing operations in the routing and forwarding of packets in data switching networks.

2. Description of the Related Art

The meanings of certain acronyms and abbreviations used herein are given in Table 1.

TABLE 1

| Acronyms and Abbreviations | |
|---|---|
| ECMP | Equal cost multi-path |
| FDB | Forwarding Database |
| IP | Internet Protocol |
| LAG | Link Aggregation Group |
| MLAG | Multi-chassis Link Aggregation Group |
| SRAM | Static Random Access Memory |
| TCP | Transmission Control Protocol |
| UDP | User Datagram Protocol |

Hash tables are widely used in computer applications, communications, and logic circuits to implement associative arrays, i.e., data structures that map keys to values. For example, hash tables are used in network switching elements, such as bridges and routers, to map keys that are derived from specified header fields of packets received by the switching element to instructions that are to be applied in forwarding the packets by the switching element. Many other applications of hash tables are known in the art.

A hash table uses a hash function to compute, for each key, an index to a "slot" in an array where the desired value is held. Such hash functions are chosen so as to provide a uniform distribution of hash results, and thus minimize the number of collisions between different keys, i.e., occurrences in which the hash function maps two (or more) keys to the same slot. Most hash table designs assume that collisions will occur and provide techniques for accommodating collisions and minimizing their effect on lookup performance.

In routing packets through switching networks, Equal cost multi-path (ECMP) is a technology for benefiting from redundancy in the network, where a router selects the link through which to send each packet between multiple possible ECMP members, e.g., egress ports or router interfaces. Packets are commonly sent in streams. A stream of packets means any number of packets from a particular source to a particular destination, where a source or destination can be any arbitrary set of identifiers, such as IP addresses or TCP port numbers outer IP addresses, inner IP addresses, UDP port numbers.

In a link aggregation group (LAG), two entities, e.g., a network switch or NIC, are connected by more than one physical interface. Today it is common to stack Ethernet switches together using a LAG to form a linked stack group having a single IP address. Advantageously, by combining switches in a stack group, the stack group is seen as if it were a single switch having a larger number of ports. A physical port in a LAG is known as a LAG member. A switch or router selects what link to send each packet between multiple LAG members.

Random selection of the link used can cause performance degradation, due to out of order packets. Therefore most switches and routers rely on a hash of the packet headers to select the LAG or ECMP member to which the packet is sent. In order to avoid hash collisions, a large number of hash values ($N_{hash}$) should be available, such that number of streams does not accede number of hash values, a common practice is to set $N_{hash}=O(N_{stream}^2)$.

When using ECMP or LAG, it is desirable to transmit a stream of packets via the same member, in order to avoid out-of-order packets and to thereby keep the routing stable, even when members are added or removed. The ability to preserve the use of a member in a packet stream, when routes are added or removed, is called consistent LAG, consistent ECMP or consistent hashing.

A simple hashing scheme is called "modulus", which operates as follows:

Per packet: hash packet headers to get a large pseudo-random number $h_{pkt} \in [0 \ldots N_{hash}-1]$ The selected member is $m=mod(h_{pkt}, N_{routes})$. However, this method does not provide consistency for either member addition or member removal.

Another simple hashing scheme is called "fine-grain", which operates as follows for each packet:

(a) hash packet headers to get a large pseudo-random number $h_{pkt} \in [0 \ldots N_{hash}-1]$.

(b) Per $h_{pkt} \in [0 \ldots N_{hash}-1]$ allocate a memory unit, which stores the current member.

(c) Per ECMP group or LAG group allocate a memory unit, which stores the available members. This method provides consistency, with a memory complexity of $O(N_{hash})$.

Some current solutions for achieving ECMP/LAG consistency and fairness rely on a large indirection table per member. The switch/router hashes the incoming packet, looks it up in the relevant member indirection table, and based on this result, it forwards the packet onward. The downside in such a solution is that it requires a large indirection table per member (thousands of entries in current embodiments, but possibly even larger magnitudes), and it is relatively hard to selectively remove link possibilities for specific members.

Another solution relies on a circle approach. A unit circle is defined by an angle θ. One can set $O(N_{hash})$ angles $\theta_i$ on the unit circle, and assign each angle a member: $\theta_i \to$ member [j]. Per packet, a hash value is calculated, and an angle $\theta_{pkt}$ is set. From $\theta_{pkt}$, a member[j] is selected by finding the largest angle $\theta_i$, which is smaller than the angle $\theta_{pkt}$. This approach enables consistent hashing, since when a member is added or removed, all its corresponding angles are added or removed, but a majority of the streams are not affected. In order to balance streams among members, it is common to have $N_{hash}=O(N_{members}^2)$ but requires $O(N_{members}^2)$ time to find the correct angle $\theta_i$.

SUMMARY OF THE INVENTION

According to disclosed embodiments of the invention, a consistent hashing scheme is used to solve the problem of selecting a member to be used by a packet in a network using ECMP or LAG. The solution reduces the amount of information needed per member from $O(N_{members}^2)$ or $O(N_{stream}^2)$, to the scale of $O(N_{members})$ yet maintains the time complexity at $O(N_{members})$ The proposed solution uses permutation of the member list, and a crafted unequal selection probability scheme to make member selection probability almost equal, while maintaining consistency hashing. The procedure always chooses the first valid member, defined as the first member after permutation and application of an unequal selection function.

Testing shows that with proper parameter selection, the distribution of members is worse than a uniform distribution, in the member fairness, by about 10% as measured by the variance $\sigma^2$. That is, if for some setup of $N_{members}$, $N_{flows}$, a fully random mapping of flow→member would result in a variance of $\sigma_{flows\,per\,member}^2=\sigma_0$, the proposed algorithm will yield a variance $\sigma^2=1.1\sigma_0$.

There is provided according to embodiments of the invention a method, which is carried out by defining in a fabric of network entities a group of the entities, and representing the group by a member vector having valid elements and invalid elements that respectively reference valid destinations and invalid destinations in the group. The method is further carried out by permuting an order of the elements in the member vector, pseudo-randomly masking a portion of the elements of the permuted member vector, and transmitting a flow of packets to the valid destination represented by a first valid element of the masked member vector.

According to an aspect of the method, the destinations are next hops in an equal cost multi-path (ECMP) group.

According to another aspect of the method, the destinations are addresses in a link aggregation group (LAG).

According to one aspect of the method, the member vector is permuted by applying a hash function to a packet header and varying the order of the member vector according to the hash function.

According to a further aspect of the method, masking includes applying a masking hash function to the permuted out member vector.

Yet another aspect of the method includes deleting one of the valid destinations from the group prior to representing the group by a member vector and redistributing the flow of packets to remaining valid destinations using the masked permuted member vector.

According to one aspect of the method, redistributing the flow of packets includes avoiding migrating flows of packets in the remaining valid destinations to other remaining valid destinations.

Still another aspect of the method includes adding a new valid destination to the group prior to representing the group by a member vector redistributing the flow of packets to include the new valid destination using the masked permuted member vector.

According to a further aspect of the method, redistributing the flow of packets includes avoiding migrating flows of packets in preexisting valid destinations to other preexisting valid destinations.

There is further provided according to embodiments of the invention a fabric of network entities for communication of data packets, wherein the network entities have a plurality of physical ports and a memory storing a forwarding database, respectively. Programmable hardware logic in the network entities are configured for representing a group of the network entities by a member vector having valid elements and invalid elements in a forwarding database that respectively reference valid destinations and invalid destinations in the group. The hardware logic is configured for permuting an order of the elements in the member vector, pseudo-randomly masking a portion of the elements of the permuted member vector, and transmitting a flow of packets to the valid destination represented by a first valid element of the masked permuted member vector.

BRIEF DESCRIPTION OF THE SEVERAL VIEWS OF THE DRAWINGS

For a better understanding of the present invention, reference is made to the detailed description of the invention, by way of example, which is to be read in conjunction with the following drawings, wherein like elements are given like reference numerals, and wherein.

DETAILED DESCRIPTION OF THE INVENTION

Figure 1:
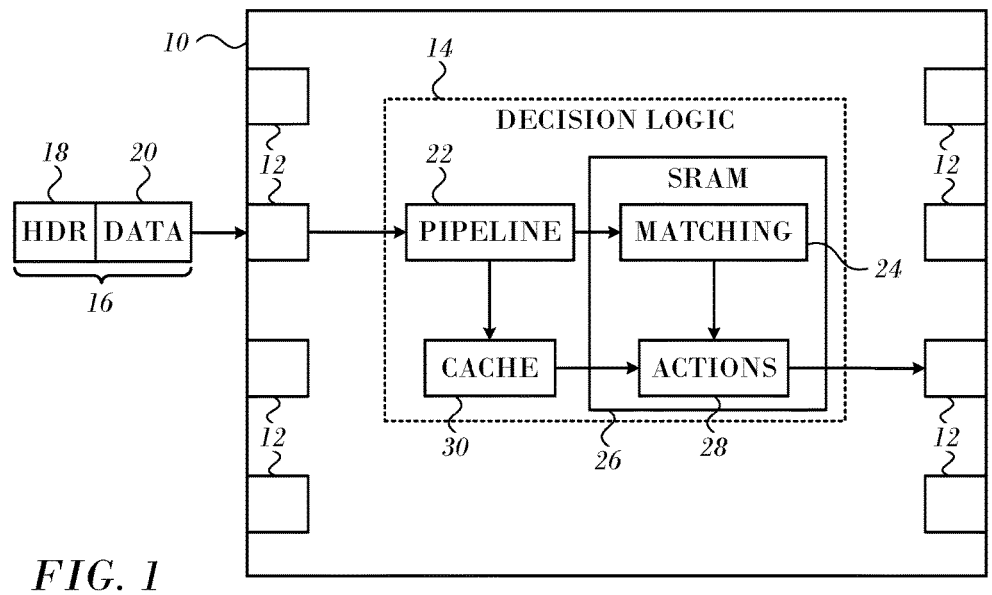
FIG. 1 is a block diagram of typical network element, which transmits packets in accordance with an embodiment of the invention.

In the following description, numerous specific details are set forth in order to provide a thorough understanding of the various principles of the present invention. It will be apparent to one skilled in the art, however, that not all these details are necessarily always needed for practicing the present invention. In this instance, well-known circuits, control logic, and the details of computer program instructions for conventional algorithms and processes have not been shown in detail in order not to obscure the general concepts unnecessarily.

Documents incorporated by reference herein are to be considered an integral part of the application except that, to the extent that any terms are defined in these incorporated documents in a manner that conflicts with definitions made explicitly or implicitly in the present specification, only the definitions in the present specification should be considered.
Definitions.

A packet that is subject to ECMP/LAG forwarding belongs to an ECMP/LAG group. A group is defined by its valid members. A member can be an egress port (in the LAG case) or a router-interface (ECMP case). A group can be represented by a vector of static pointers, which are either valid or invalid. A pointer points to all the properties of the member, e.g., port number, router interface number. Selecting a member is equivalent to selecting a pointer to that member. The principles of the invention are applicable to ECMP and LAG forwarding, although the discussion, which follows often specifies ECMP routes for convenience. Those skilled in the art can readily adapt these principles to LAG forwarding.
Overview.

When a failure occurs in one or more paths through a fabric, conventional recalculating the next hop for all paths typically would result in the reordering of all flows. Consistent load balancing according to principles of the invention overrides this behavior so that only flows for links that have become inactive are redirected. Thus, in a consistent hashing scheme, some flows are migrated from one ECMP destination, (or LAG port) and redistributed to the remainder of the destinations another, while other flows remain in their original destinations. In a case that the number of available destinations increases, some flows will use the new destinations. Assume that in a group of four destinations, each destination handles 25% of the flows, and a fifth destination becomes active. It is desirable that each of the five destinations hold 20% of the flows. This can be accomplished by moving 20% of the flows from each of the preexisting four destinations to the new destination. However, flows are not migrated from one preexisting destination to another preexisting destination. Similarly, when the number of destinations decreases, the flows of an inactivated destination may be distributed to the remaining destinations, while the existing flows in the remaining destinations remain in place. Preferably, the scheme that follows is implemented in hardware for reasons of efficiency. In particular, the methods employed in embodiments of the invention incur less memory overhead as compared to fine grain ECMP rearrangements.

Turning now to the drawings, reference is now made to FIG. 1, which is a block diagram of typical network element 10, which transmits packets in accordance with an embodiment of the invention. The element 10 may be a component of a LAG or MLAG. It can be configured as a network or fabric switch or a router, for example, with multiple ports 12 connected to a packet communication network. Decision logic 14 within element 10 applies classification rules in forwarding data packets 16 between ports 12, as well as performing other actions, such as encapsulation and decapsulation, security filtering, and quality-of-service functions. The circuitry needed for carrying out such forwarding and other functions will be apparent to those skilled in the art and is omitted from the figures for the sake of simplicity, in order to concentrate on the actual classification functions of decision logic 14.

In the pictured embodiment, decision logic 14 receives packets 16, each containing a header 18 and payload data 20. A processing pipeline 22 in decision logic 14 extracts a classification key from each packet, typically (although not necessarily) including the contents of certain fields of header 18. For example, the key may comprise the source and destination addresses and ports and a protocol identifier. Pipeline 22 matches the key against a matching database 24 containing a set of rule entries, which is stored in an SRAM 26 in network element 10, as described in detail hereinbelow. SRAM 26 also contains a list of actions 28 to be performed when a key is found to match one of the rule entries and may include a forwarding database. For this purpose, each rule entry typically contains a pointer to the particular action that decision logic 14 is to apply to packets 16 in case of a match. Pipeline 22 typically comprises dedicated or programmable hardware logic, which is configured to carry out the functions described herein.

In addition, network element 10 typically comprises a cache 30, which contains rules that have not been incorporated into the matching database 24 in SRAM 26. Cache 30 may contain, for example, rules that have recently been added to network element 10 and not yet incorporated into the data structure of matching database 24, and/or rules having rule patterns that occur with low frequency, so that their incorporation into the data structure of matching database 24 would be impractical. The entries in cache 30 likewise point to corresponding actions 28 in SRAM 26. Pipeline 22 may match the classification keys of all incoming packets 16 against both matching database 24 in SRAM 26 and cache 30. Alternatively, cache 30 may be addressed only if a given classification key does not match any of the rule entries in database 24 or if the matching rule entry indicates (based on the value of a designated flag, for example) that cache 30 should be checked, as well, for a possible match to a rule with higher priority.
Traffic Flow.

Figure 2:
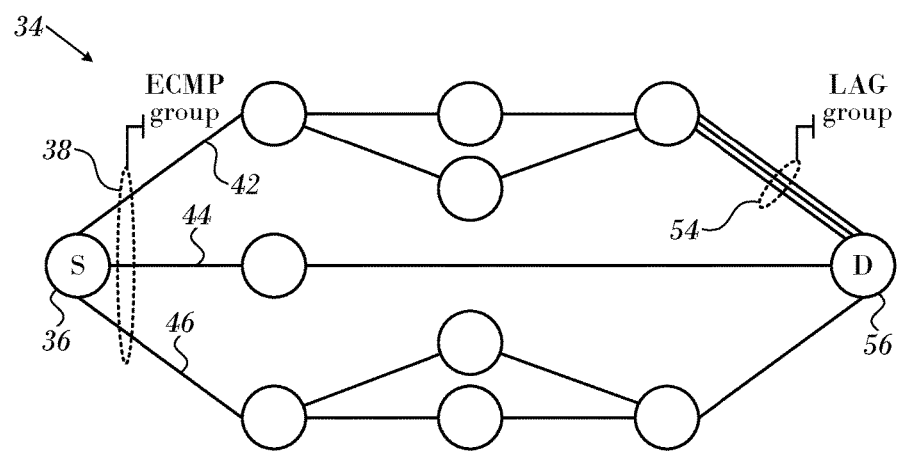
FIG. 2 is a schematic diagram of a portion of a fabric in which ECMP forwarding is applied in accordance with an embodiment of the invention.

When a LAG stack is based on standard Ethernet links, each device performs standard layer 2 (bridge) forwarding. Reference is now made to FIG. 2, which is a schematic diagram of a portion of a fabric 34 in which ECMP forwarding is applied in accordance with an embodiment of the invention. Packets received in source switch 36 are to be forwarded via an ECMP group 38. The fabric 34 includes LAG 54. In the example of FIG. 2, ECMP group 38 is used for packets that could be routed to destination switch 56 over one of paths 42, 44, 46.

Figure 3:
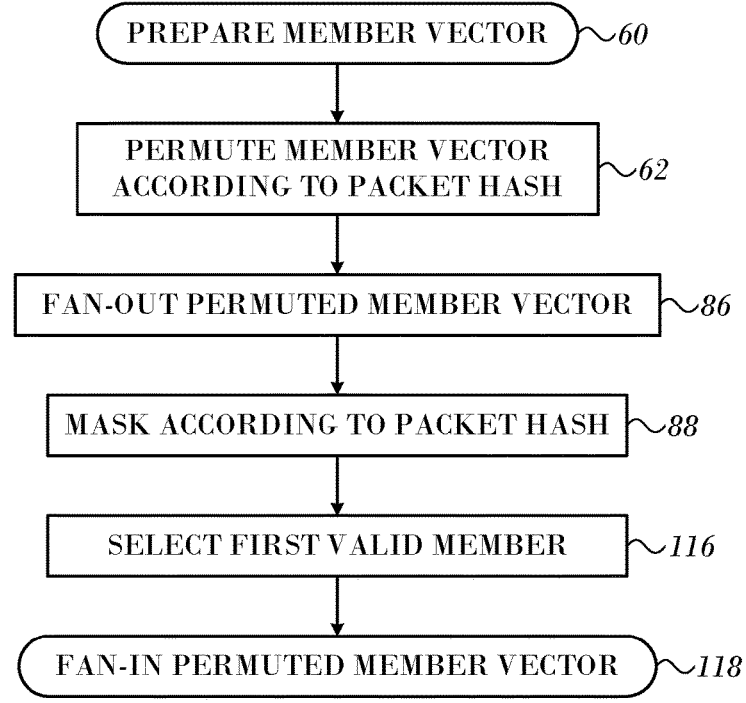
FIG. 3 is a flow chart of a method of choosing a member of an ECMP group or LAG in accordance with an embodiment of the invention.

Reference is now made to FIG. 3, which is a flow chart of a method of choosing a member of an ECMP group in accordance with an embodiment of the invention, i.e., one of paths 42, 44, 46, using the example of FIG. 2. Each switch or forwarder performs the method to select the next hop. The strategy employed is to choose the first available member of the group, after a pseudo-random permuting of the member ordering in the group, and after pseudo-random masking-out of some of the members of the group, using non-equal masking probability for each member. This advantageously avoids holding many hash table entries per member, and eliminates a large number of comparators in a row.

The process steps of the following algorithm are shown in a particular linear sequence in FIG. 3 for clarity of presentation. However, it will be evident that many of them can be performed in parallel, asynchronously, or in different orders. Those skilled in the art will also appreciate that a process could alternatively be represented as a number of interrelated states or events, e.g., in a state diagram. Moreover, not all illustrated process steps may be required to implement the method.

At initial step 60 a member vector is prepared, based on the fabric topology. Individual member vectors may be maintained in each element of the fabric. Alternatively, a fabric controller (not shown) may maintain respective versions of the member vector for the fabric, recognizing that each switch or forwarder sees only the next hop.

Next, at step 62 the member vector prepared in initial step 60 is permuted, using a hash function. Selection of the hash function from a group of suitably chosen hash functions produces nearly ideal pseudorandom rearrangements of the member vector. Suitable hash functions include Bitwise-XOR, CRC32, CRC16, Toeplitz-Hash, and MD5. In the example of FIG. 2 there is a finite predefined set of permutation of the member vector. Thus, if the member vector is of size 128 (where there can be 2, 3, 4, 10, etc. valid members in an ECMP group), There are three valid members in the case of ECMP group 38. There are theoretically 128! permutations, of which we might choose 1024. From that finite set of 1024, a permutation is selected using a hash function applied to the packet-header, and a permutation of the relevant group vector is performed. The permutation operation has a relatively small requirement for hardware elements compared to the generation of a pseudorandom number series.

It should be noted that a packet that is to be forwarded in a manner not involving ECMP or LAG according to the forwarding database of the switch does not activate the permutation mechanism.

The following discussion explains how the first valid member of a permuted member vector is made to randomly appear.

Figure 4:
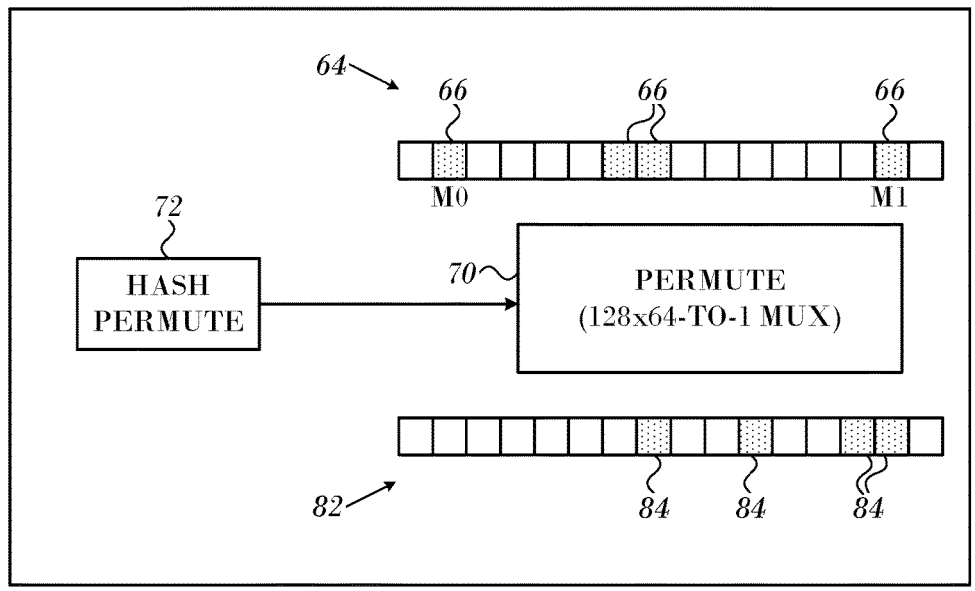
FIG. 4 is an exemplary diagram illustrating in detail aspects of the method of FIG. 3 in accordance with an embodiment of the invention.

Reference is now made to FIG. 4, which is a diagram illustrating initial step 60 and step 62 (FIG. 3) in accordance with an embodiment of the invention. Member vector 64 comprises a set of pointers indicated by squares. As noted above, member vectors may comprise a large number of pointers, depending on the vector size for each switch device. Assuming a vector size of 128, the largest ECMP group supported by that switch would be 128. For simplicity a much smaller number is illustrated in FIG. 4. The member vector 64 comprises four elements 66, which are valid members that references four ECMP routes through the fabric to the next hop, denoted as routes A, B, C, D. Packet traffic could be distributed via routes A, B, C, D. Alternatively, route A could be designated to receive twice the flow of the previous alternative, and the routes might then be (A, A, B, C). The other elements of the member vector 64 are not valid members.

The set of valid members changes when a new route is introduced. Thus, if a new route were introduced that directly connected switches 36, 56 then ECMP group 38 would increase from three to four valid members.

Permutation of the member vector 64 is indicated by block 70 according to hash function 72. The algorithm represented by FIG. 3 can be efficiently implemented in hardware, using techniques known by those skilled in the art. For example, the permutation described above can be realized using a multiplexor.

Figure 5:
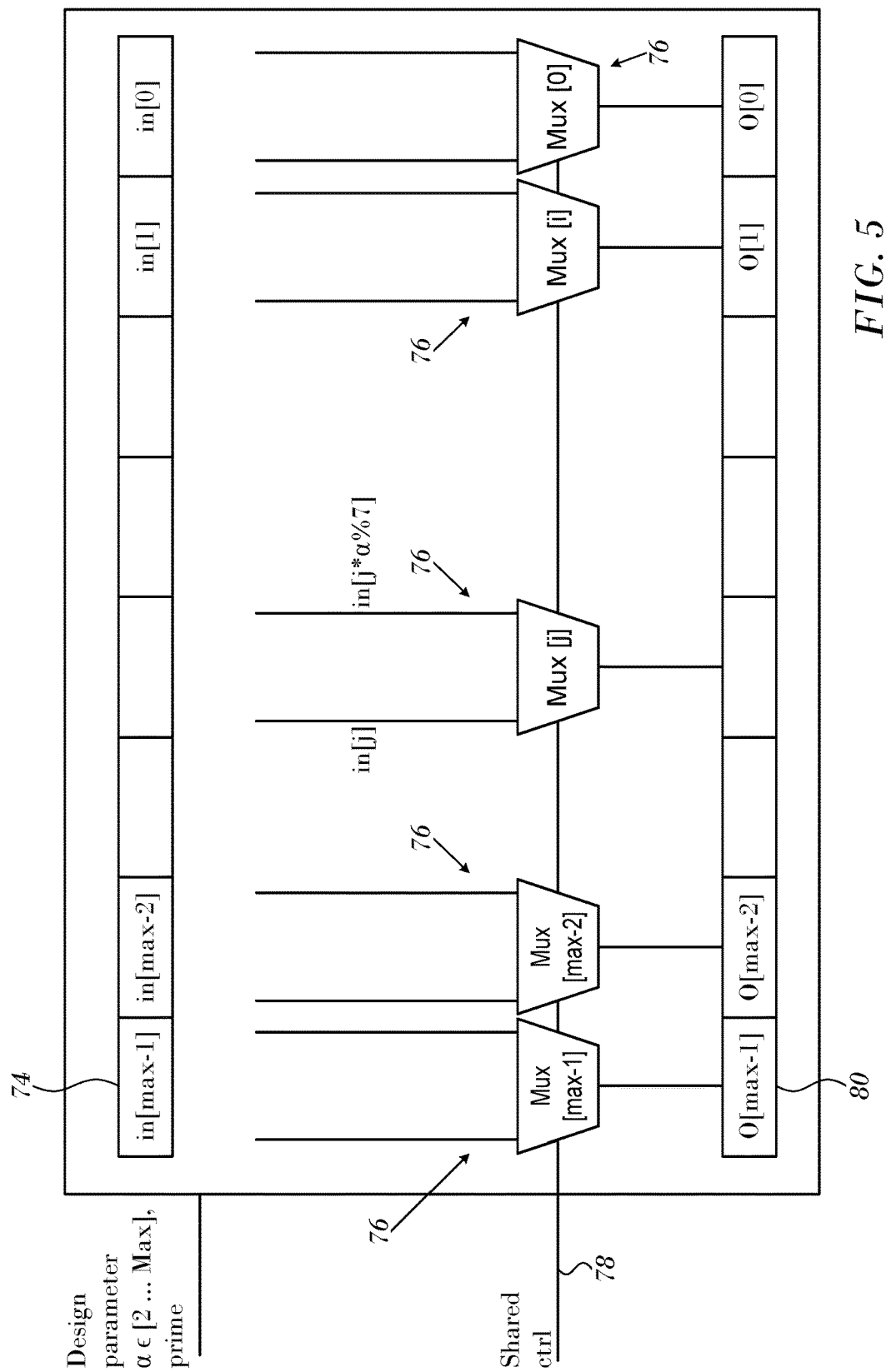
FIG. 5 is a schematic of a portion of an electrical circuit for permuting a member vector in accordance with an embodiment of the invention.

Reference is now made to FIG. 5, which is a schematic of a portion of an electrical circuit for permuting a member vector 74 in accordance with an embodiment of the invention. Chaining of blocks 76 is illustrated. A line shared ctrl 78 (one bit per block) comes from the packet hash. Each of the block receives a different bit from the hash. Each block creates two permutations: {no-permutation, $\alpha_i$ permutation} So there exist $2^k$ permutations, which can result from processing the last block and be applied to created permuted vector 80.

Moreover, other permutation creation techniques known in the art may be substituted in step 62

In FIG. 4 the result of the permutation is shown as a permuted member vector 82. Its valid members, now indicated as permuted elements 84 represent a reordering and redistribution of the elements 66 according to the particular hash function 72 that was applied in block 70.

A conventional method for choosing a member of a group, such as an element of the member vector 64, begins by choosing an entry point, and scanning the group from the entry point forward, wrapping around, and continuing back to the entry point until a valid member is found. In the case of member vector 64 scanning the elements from left to right would find member M1 prior to member M0 for almost every entry point in the vector, which leads to unfairness in load-balancing between members M0 and M1.

After permutation of the member vector 64 into permuted member vector 82 a selection from a well-chosen set of permutation functions, for any pair of elements 84, either member has an equal probability of preceding the other in a scan. Indeed, for any set of elements 84, any member of the set has an almost equal likelihood of preceding another member. In a practical system there should be at least 2N permutations available for selection, where N is the ECMP vector size.

The permutation operation in block 70 consumes $O(\log_2$ (number of permutations) time.

Reverting to FIG. 3, in step 86 the permuted member vector 82 (FIG. 4) is inflated 3-fold, a step known as "fan out", followed by a masking operation in step 88.

Figure 6:
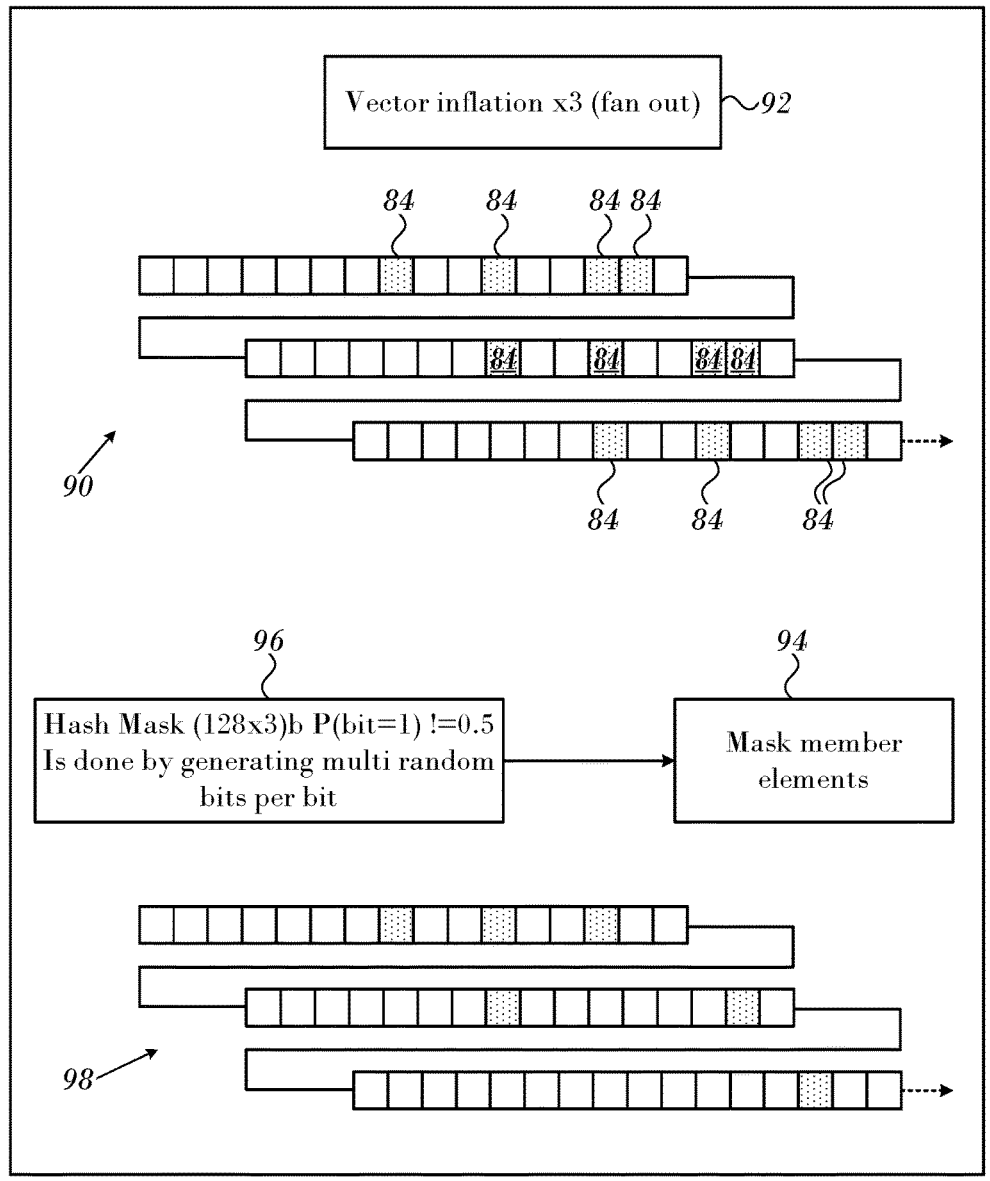
FIG. 6 is a diagram illustrating in detail additional aspects of the method of FIG. 3 in accordance with an embodiment of the invention.

Reference is now made to FIG. 6, which is a diagram illustrating steps 86, 88 (FIG. 3) in accordance with an embodiment of the invention. Inflation of the permuted member vector 82 into a longer member vector 90, is represented by block 92. This is accomplished by concatenation of the permuted member vector 82 with itself. Member vector 90 now comprises 3 consecutive instances of the permuted member vector 82 and thus three repeating sets of the elements 84.

Step 88 is accomplished in block 94 by applying a hash masking function 96 to the member vector 90. In an efficient hardware implementation, the hash masking function 96 is performed by computing random bits, using the hash function, and applying an AND ("&") operation between the fan-out-vector and the random-bits-vector such that a bit vector has each bit pseudo-randomly set to 1 with a chosen probability, e.g., 0.5. Masking out the elements 84 is done simultaneously, resulting in a masked permuted member vector 98. The masking operation in block 94 is thus done in O(1) time. The intent is to randomly eliminate a predefined percentage of the valid members, which in this example is 50%.

Figure 7:
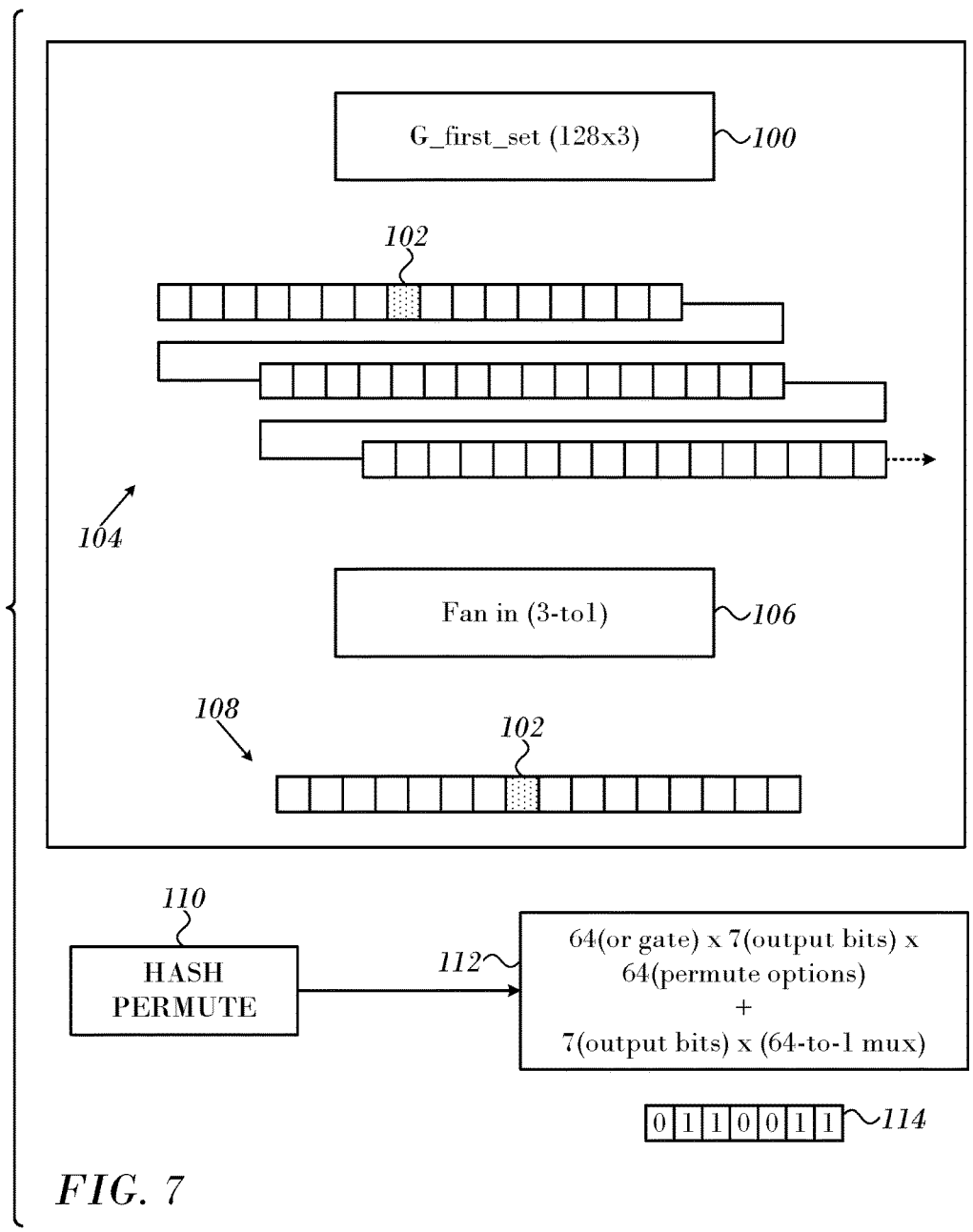
FIG. 7 is a diagram illustrating additional aspects of the method of FIG. 3 in accordance with an embodiment of the invention.

Reference is now made to FIG. 7, which is a diagram illustrating the effect of step 88 (FIG. 3) in accordance with an embodiment of the invention. The first valid member in the masked permuted member vector 98 (FIG. 6) is selected in block 100. A selected member 102 is indicated in member vector 104. Then the inverse of the vector inflation of block 92 (FIG. 6) is performed in block 106 by removing the concatenated instances of the original member vector 64 that do not contain the member 102. The process is referred to as "fan-in". Member vector 108, containing the member 102 is the result.

An additional permutation operation 110 may be performed on the member 102 in block 112, resulting in a 7-bit output vector 114, which is interpreted as an integer that identifies the ECMP (or LAG)-member to which the packet will be forwarded.

Reverting to FIG. 3, step 116 and final step 118 correspond to the operations of blocks 100, 106, 112 (FIG. 7), respectively. The procedure of FIG. 3 results in a balanced set of permutations, a balanced set of probabilities per maskingbit, and O ($N_{members}$) of memory. The procedure further provides consistency in the random selection of alternate routes in case of member removal, with O ($N_{members}$) computation time. Similarly, the procedure may be adapted, mutatis mutandis, to consistently select flows to be migrated to a newly added member of a fabric.

Example.

The following example illustrates nearly ideal randomization in selection of member elements in a simulation of the above-described procedure, which was conducted using the pseudocode simulation design shown in Listing 1.

---
Listing 1
---

A member vector (mem_vec) is loaded. Vector is 128b for LAG and 64b for ECMP.
    1) /* If a 64b member vector is loaded, it is duplicated twice for a 128 vector.
    a [0..ch_max_perm-1] hash is generated, called ch_permute_hash
    mem_vec is permuted to create mem_vec_permuted, using:
    ch_permute_hash [128] × [ch_max_perm]-to-1 muxes:
    mem_vec_permuted is duplicated (fan out)
ch_mem_vec_fen_out_size times
    [128] × [ch_mem_vec_fan_out_size] random bits are generated such that probabilities of bits are (counting from MSB):
    [$\frac{1}{64}$] × 64 bits
    [$\frac{1}{32}$] × 64 bits
    [$\frac{1}{4}$] × 128 bits
    [$\frac{1}{2}$] × 128 bits
    Mem_vec_permuted_mask = Mem_vec_permuted & random bits are computed
    Mem_vec_permuted_mask_$1^{st}$ = Find_$1^{st}$_set(Mem_vec_permuted_mask)
    2) /* Find_1st_set over [ch_mem_vec_fan_out_size]×[128] bits:
    If (~|Mem_vec_permuted_mask_$1^{st}$) →
    Mem_vec_permuted_mask_$1^{st}$ = Find_last_set(Mem_vec_permuted)
    Mem_vec_permuted_mask_fan_in = fold(Mem_vec_permuted_mask_$1^{st}$, 128)
    /*This is 128 × ch_mem_vec_fan_out_size "x/or" gates.
    Out_port = reassemble(Mem_vec_permuted_mask_fan_in, ch_permute_hash).
    /*this is 7(each output bit) × ch_max_perm -to-1 muxes
    3)./*Design Parameters
    ch_max_perm = 64
    ch_mem_vec_fen_out_size = 3

---

Figure 8:
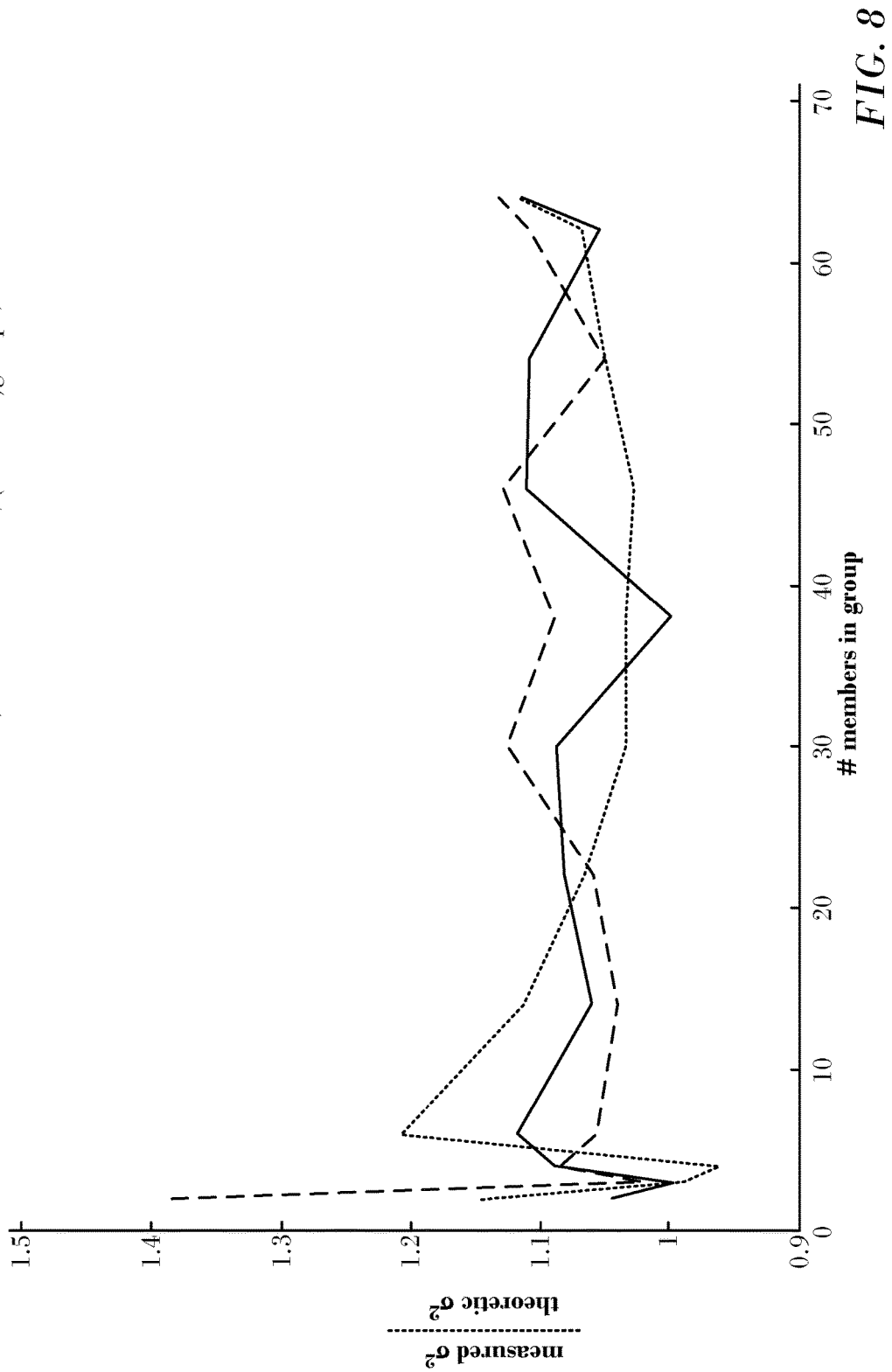
FIG. 8 is a plot of simulation results in accordance with an embodiment of the invention.

Reference is now made to FIG. 8, which is a plot of simulation results using the above-described design. The variance of the number of flows per ECMPmember elements is compared to a theoretical random distribution and plotted against the number of valid member elements in a member vector. Three separate simulations were conducted. The results are mostly within 10% of the theoretical prediction.

ECMP Group Size Change.

ECMP group size change is hardware-handled. When a new member is introduced, some of the existing flows switch to the new member, while respecting current activity status—an active flow remains on its old ECMP member, and when the flow becomes inactive, it may then be reassigned to the new ECMP member. Non-active flows stay on their original ECMP members.

Figure 9:
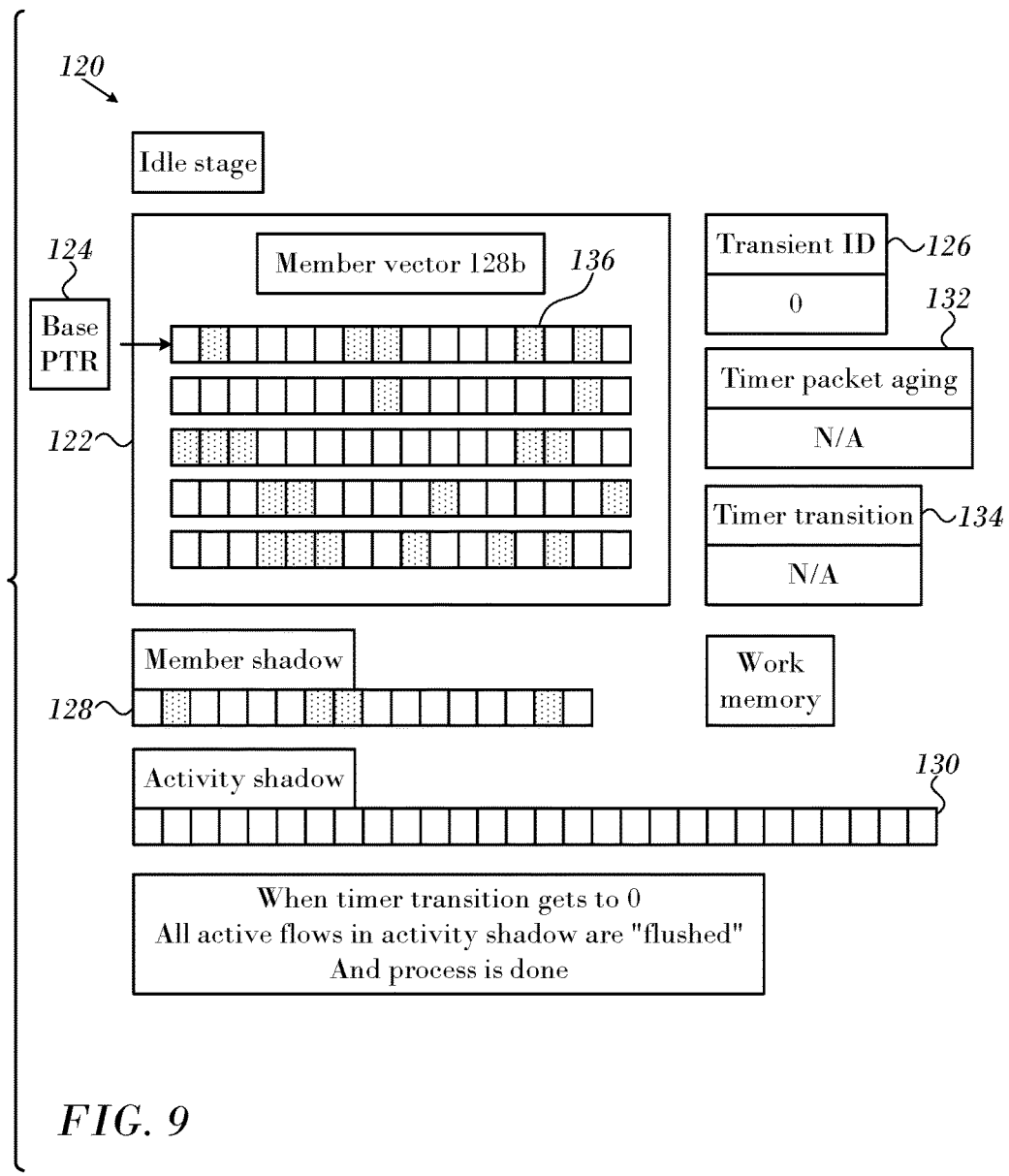
FIG. 9 is a diagram illustrating a typical group table in accordance with an embodiment of the invention.

Reference is now made to FIG. 9, which is a diagram illustrating a typical ECMP group table 120, in accordance with an embodiment of the invention. The status is idle. The group table 120 includes a member vector 122, which in this example is represented as an array of 128 pointers to properties of the members. The member vector 122 is referenced by a base pointer 124 along with other related information (not shown). The properties typically include a physical port number or router interface number and may include other data that are discussed below. Included in the group table 120 are a transient identification number 126 (varying from 0 to the number of groups—1), work memory 128, activity shadow memory 130 and timers 132, 134 for packet aging and timer transition, respectively. The group table 120 essentially is a routing table that may require updating to add or delete paths. Member 136 represents a new port or switch, which is being added to the group table 120. Migration of flows to new routes is performed when the flows are idle. The discussion below describes how this is accomplished so as to achieve consistent load balancing and minimum disruption. Although one instance of the work memory 128 and activity shadow memory 130 is shown in FIG. 9, the system may concurrently support a member change in more than one group, each such change having its own instance of the work memory 128 and activity shadow memory 130 and related instances of timers 132, 134.

Figure 10:
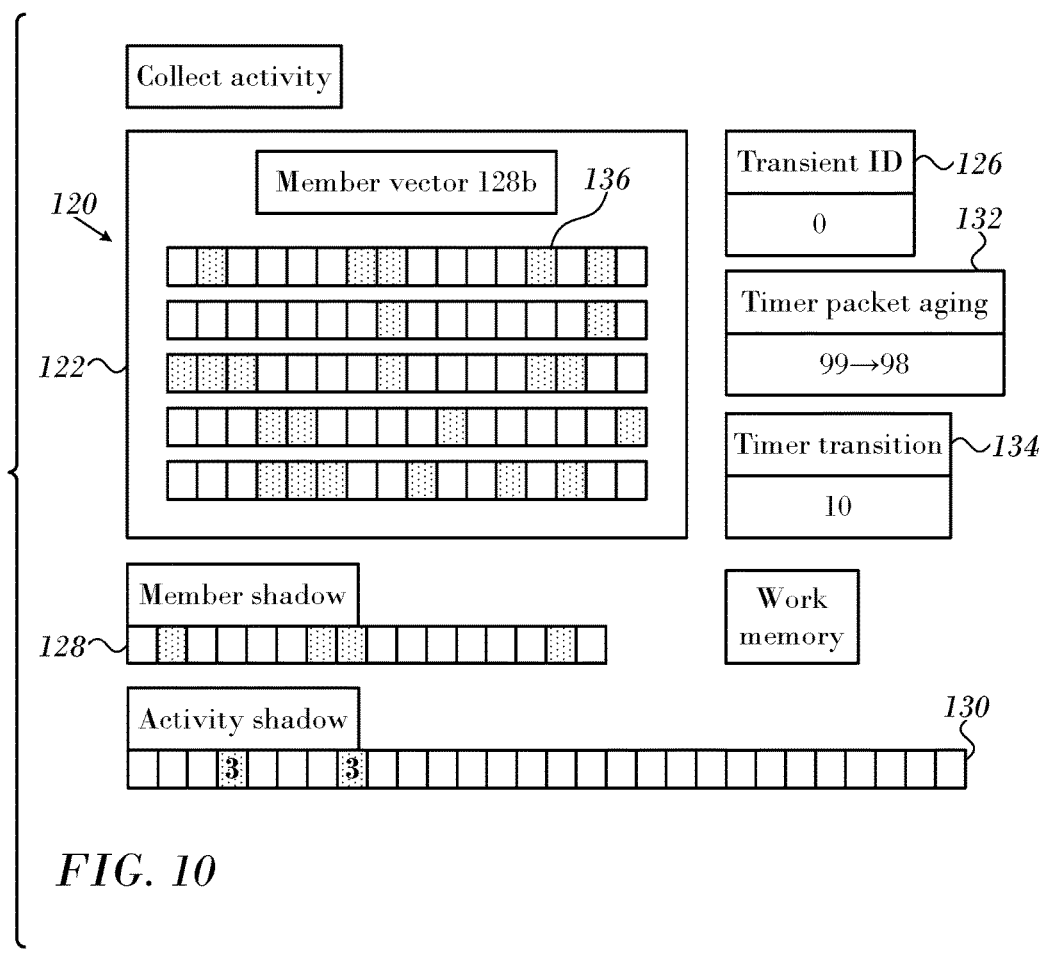
FIG. 10 is a diagram of the group table of FIG. 9 at the beginning of the process of adding a new member to a group, in accordance with an embodiment of the invention.

Reference is now made to FIG. 10, which is a diagram of the group table 120 at the beginning of the process of adding a new member, in accordance with an embodiment of the invention. Flow activity is being collected. This is reflected by work memory 128 being populated with member elements participating in an active flow, and activity shadow memory 130 having entries indicating flow activity. This state continues until an active flow becomes idle, as measured by timer 132 or timeout indicated by packet aging timer 134. For each packet, a hash value, referred to herein as "hash-for-activity" is computed. The value hash-for-activity is in the range [0 . . . n_activity_flows], which is the same size as the activity shadow memory 130.

Each slot in the activity shadow memory 130 represents an activity state of one or more flow(s), When a new member is introduced, all those slots are initialized as 'active=3', although their activity status is not yet known. Each time the packet-aging timer 132 ticks, the activity state of all slots is changed from 'active=3'→'maybe active=2'→'not active=0'.

Each time a packet arrives, and its slot activity is not 'not active=0', that packet is served using the work memory 128. Its slot activity state is changed from 'maybe active=2'→'active=3'.

Figure 11:
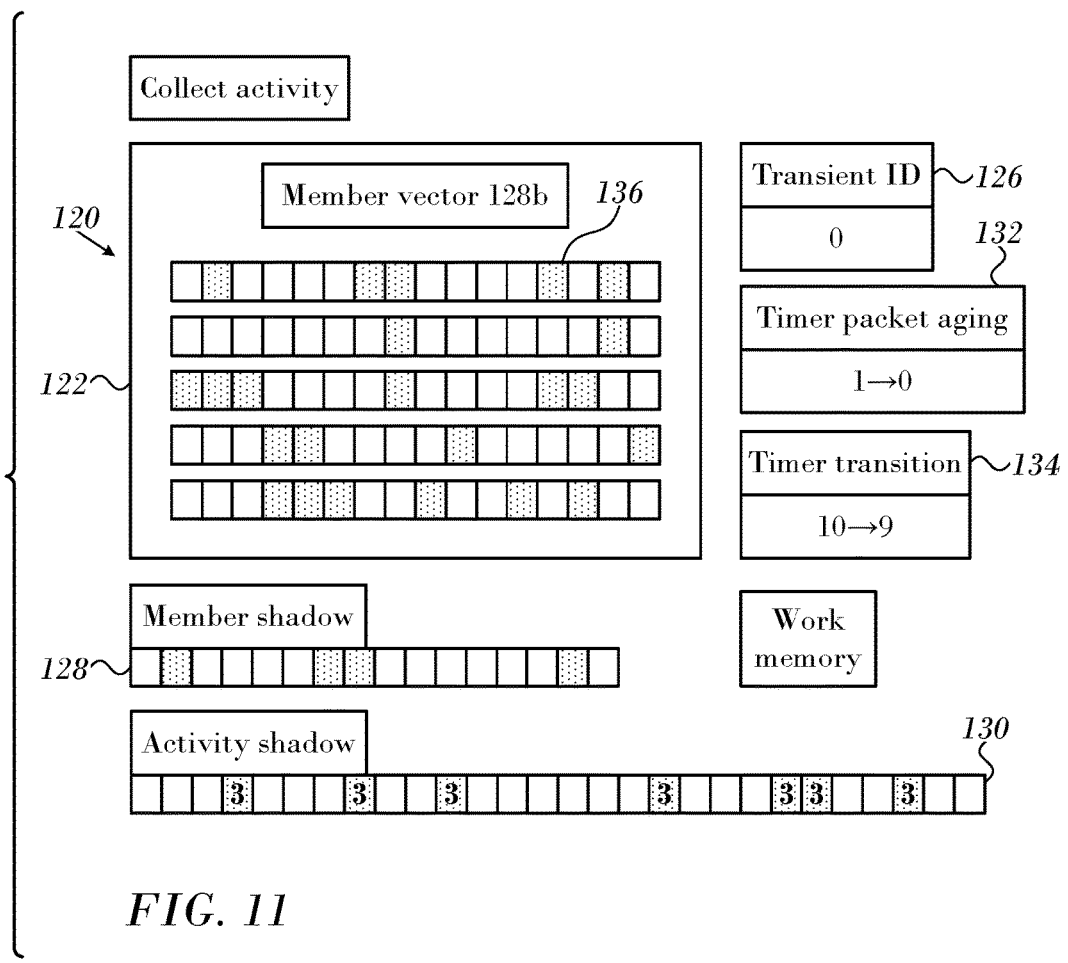
FIG. 11 is a diagram of the group table of FIG. 9 near the completion of flow activity collection, in accordance with an embodiment of the invention.

Reference is now made to FIG. 11, which is a diagram of the group table 120 near the completion of flow activity collection, in accordance with an embodiment of the invention. The timer 132 has decremented and is about to time out. The activity shadow memory 130 indicates increased activity as compared with FIG. 10.

Figure 12:
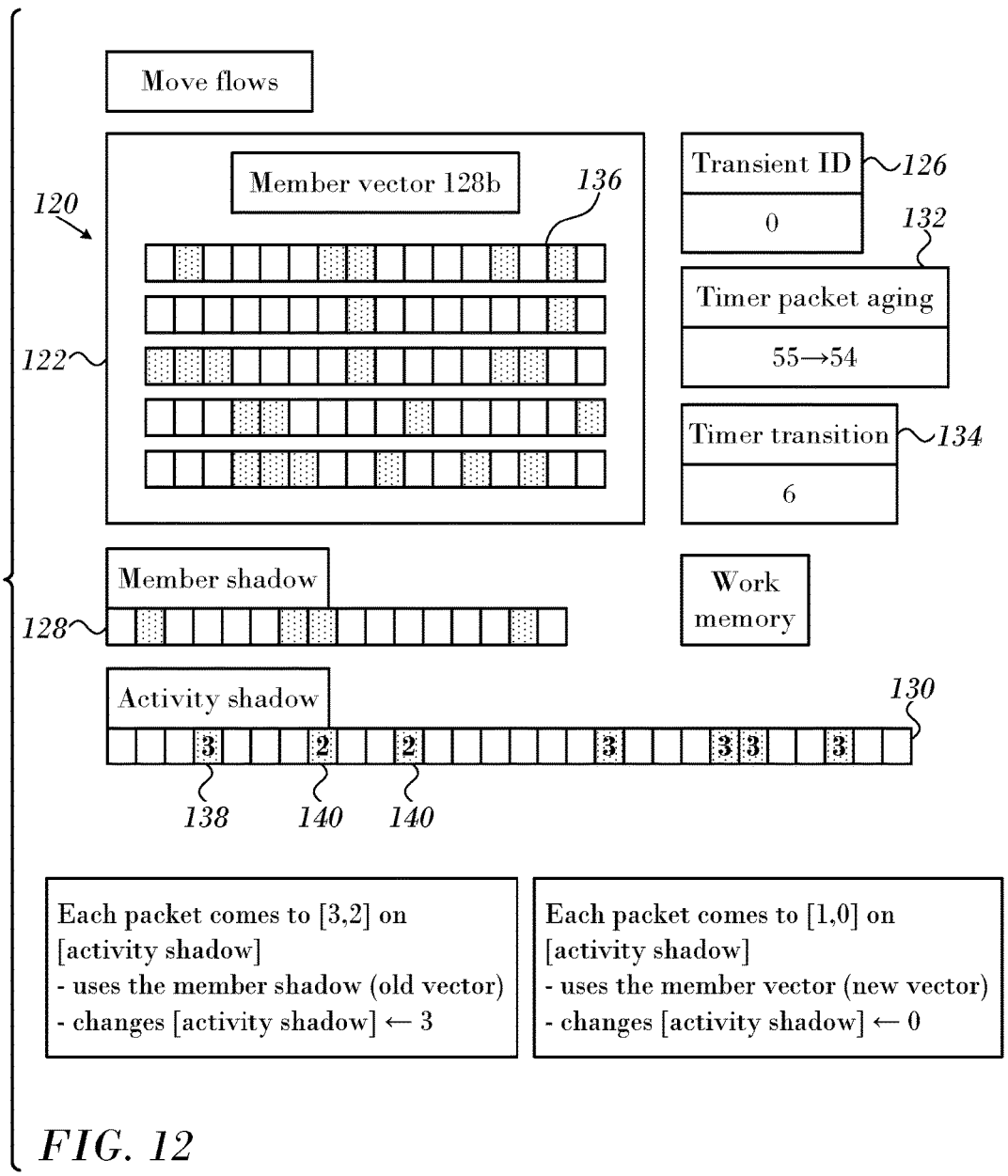
FIG. 12 is a diagram of the group table of FIG. 9 after completion of collection activity and at the beginning of the process of migrating flows in accordance with an embodiment of the invention.

Reference is now made to FIG. 12, which is a diagram of the group table 120 after completion of collection activity and at the beginning of the process of migrating flows in accordance with an embodiment of the invention. An idle flow previously assigned to a route 138 (activity state active=3), represented by entries in activity shadow memory 130, is assigned to a new route 140 (activity state active=2).

Figure 13:
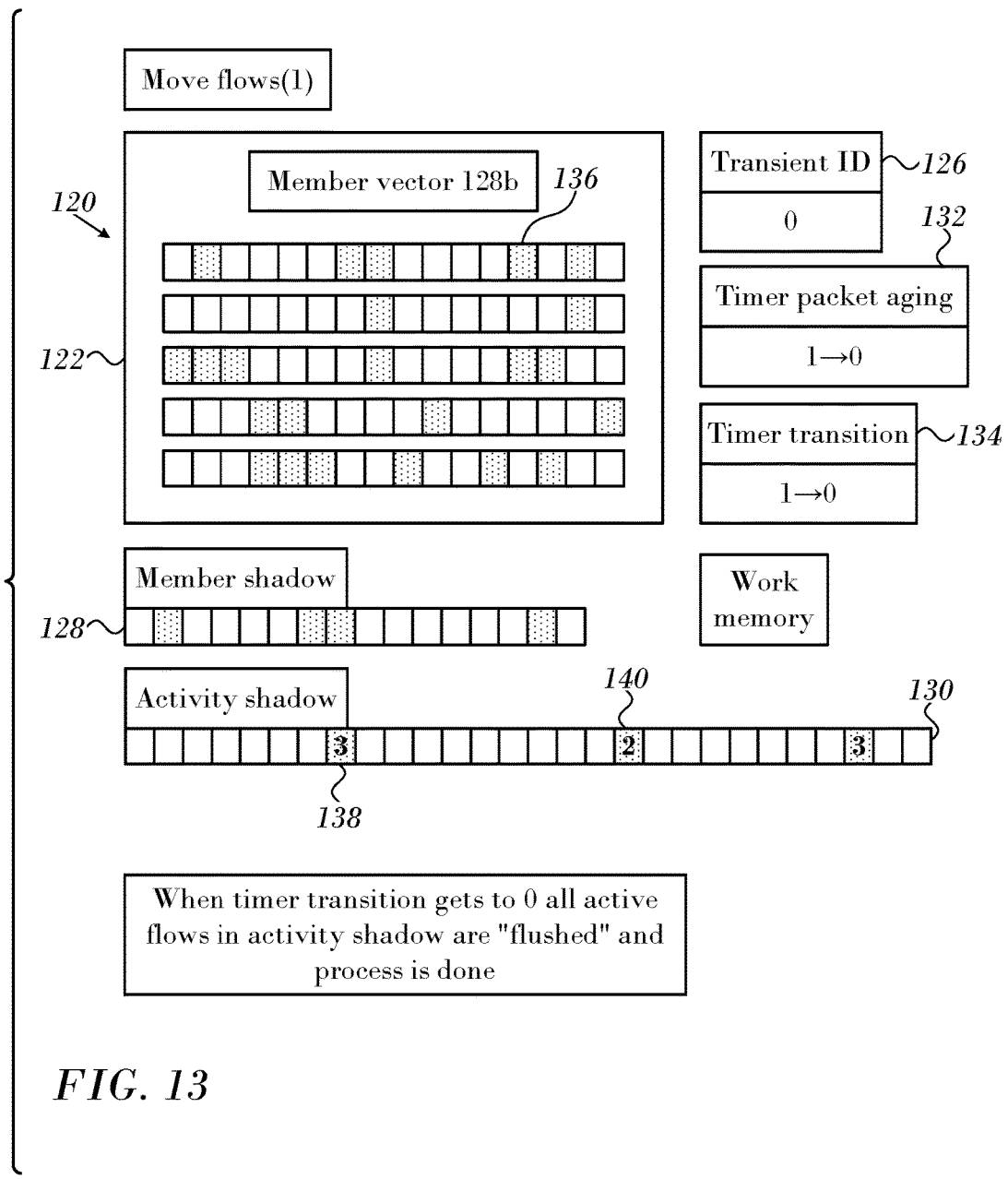
FIG. 13 is a diagram of the group table of FIG. 9 near the completion of the process of migrating flows in accordance with an embodiment of the invention.

Reference is now made to FIG. 13, which is a diagram of the group table 120 near the completion of the process of migrating flows in accordance with an embodiment of the invention. The timer 134 has decremented to zero, and the activity shadow memory 130 is about to be flushed. Most packets following route 138 have completed their route. However, if the timer 134 has decremented to zero several times, and some flows are still considered active, it is considered that such flows are living infinitely, and they are forced to use the new member vector.

It will be appreciated by persons skilled in the art that the present invention is not limited to what has been particularly shown and described hereinabove. Rather, the scope of the present invention includes both combinations and sub-combinations of the various features described hereinabove, as well as variations and modifications thereof that are not in the prior art, which would occur to persons skilled in the art upon reading the foregoing description.

The invention claimed is:

1. A method, comprising the steps of:
defining in a fabric of network entities a group of the entities, wherein the network entities have a plurality of physical ports and are interconnected via a data network;
representing the group by a member vector having elements, including valid elements and invalid elements that respectively reference valid destinations and invalid destinations in the group;
permuting an order of the elements in the member vector to define a permuted member vector;
pseudorandomly masking a portion of the elements of the permuted member vector to define a masked permuted member vector; and
transmitting via the physical ports and the data network a flow of packets to the valid destination represented by a first valid element of the masked permuted member vector.

2. The method according to claim 1, wherein the destinations are next hops in an equal cost multi-path (ECMP) group.

3. The method according to claim 1, wherein the destinations are addresses in a link aggregation group (LAG).

4. The method according to claim 1, wherein permuting an order comprises applying a hash function to a packet header and varying the order according to the hash function.

5. The method according to claim 1, wherein masking comprises applying a masking hash function to the permuted member vector.

6. The method according to claim 1, further comprising deleting one of the valid destinations from the group prior to representing the group by a member vector and redistributing the flow of packets to remaining valid destinations using the masked permuted member vector.

7. The method according to claim 6, wherein redistributing the flow of packets comprises avoiding migrating flows of packets in the remaining valid destinations to other remaining valid destinations.

8. The method according to claim 1, further comprising adding a new valid destination to the group prior to representing the group by a member vector redistributing the flow of packets to include the new valid destination using the masked permuted member vector.

9. The method according to claim 8, wherein redistributing the flow of packets comprises avoiding migrating flows of packets in preexisting valid destinations to other preexisting valid destinations.

10. A system, comprising the steps of:
a fabric of network entities for communication of data packets, wherein the network entities have a plurality of physical ports and a memory storing a forwarding database, respectively; and
programmable hardware logic in the network entities configured for performing the steps of:
representing a group of the network entities by a member vector having elements, including valid elements and invalid elements in the forwarding database that respectively reference valid destinations and invalid destinations in the group;
permuting an order of the elements in the member vector to define a permuted member vector;
pseudo-randomly masking a portion of the elements of the permuted member vector to define a masked permuted member vector; and
transmitting a flow of packets to the valid destination represented by a first valid element of the masked permuted member vector.

11. The system according to claim 10, wherein the destinations are next hops in an equal cost multi-path (ECMP) group.

12. The system according to claim 10, wherein the destinations are addresses in a link aggregation group (LAG).

13. The system according to claim 10, wherein permuting an order comprises applying a hash function to a packet header and varying the order according to the hash function.

14. The system according to claim 10, wherein masking comprises applying a masking hash function to the permuted member vector.

15. The system according to claim 10, wherein the hardware logic is configured for deleting one of the valid destinations from the group prior to representing the group by a member vector and redistributing the flow of packets to remaining valid destinations using the masked permuted member vector.

16. The system according to claim 15, wherein redistributing the flow of packets comprises avoiding migrating flows of packets in the remaining valid destinations to other remaining valid destinations.

17. The system according to claim 10, wherein the hardware logic is configured for adding a new valid destination to the group prior to representing the group by a member vector redistributing the flow of packets to include the new valid destination using the masked permuted member vector.

18. The system according to claim 17, wherein redistributing the flow of packets comprises avoiding migrating flows of packets in preexisting valid destinations to other preexisting valid destinations.

* * * * *